United States Patent
Stott

(10) Patent No.: US 11,871,741 B2
(45) Date of Patent: Jan. 16, 2024

(54) INSTANTLY ADJUSTABLE STRIKE INDICATOR CREATED BY FRICTION ASSEMBLY

(71) Applicant: Jeremy Stott Flyfishing, LLC, Glenwood Springs, CO (US)

(72) Inventor: Jeremy Stott, Glenwood Springs, CO (US)

(73) Assignee: Jeremy Stott Flyfishing, LLC, Glenwood Springs, CO (US)

( * ) Notice: Subject to any disclaimer, the term of this patent is extended or adjusted under 35 U.S.C. 154(b) by 0 days.

(21) Appl. No.: 17/658,205

(22) Filed: Apr. 6, 2022

(65) Prior Publication Data

US 2023/0320335 A1   Oct. 12, 2023

(51) Int. Cl.
*A01K 97/12*   (2006.01)

(52) U.S. Cl.
CPC .................... *A01K 97/12* (2013.01)

(58) Field of Classification Search
CPC ......... A01K 93/02; A01K 97/12; A01K 97/01
See application file for complete search history.

(56) References Cited

U.S. PATENT DOCUMENTS

| | | | | |
|---|---|---|---|---|
| 2,784,518 A * | 3/1957 | Boyer | ................. | A01K 93/00 43/42.31 |
| 3,161,982 A * | 12/1964 | Lee | ................. | A01K 93/00 43/43.1 |
| 3,808,728 A * | 5/1974 | Ratte, Jr. | ................. | A01K 95/00 43/44.91 |
| 4,194,936 A * | 3/1980 | Martuch | ................. | A01K 93/00 156/267 |
| 4,279,092 A * | 7/1981 | Hutson | ................. | A01K 95/00 43/44.89 |
| 5,216,831 A * | 6/1993 | Halterman, Jr. | ....... | A01K 93/00 43/44.92 |
| 5,279,066 A * | 1/1994 | Camera | ................. | A01K 91/06 43/44.9 |
| 5,515,639 A * | 5/1996 | Phipps | ................. | A01K 97/12 43/43.12 |
| 5,675,927 A * | 10/1997 | Kloos | ................. | A01K 93/02 43/44.9 |
| 6,880,289 B1 * | 4/2005 | Yin | ................. | A01K 91/047 403/353 |
| 7,607,253 B2 * | 10/2009 | Makowski | ............. | A01K 91/06 43/17.5 |
| 9,591,841 B2 * | 3/2017 | Schoenike | ............. | A01K 93/02 |
| 10,624,329 B2 * | 4/2020 | Broughton | ............. | A01K 97/12 |
| 2011/0203156 A1 * | 8/2011 | Christiansen | .......... | A01K 93/00 43/17 |
| 2012/0055072 A1 * | 3/2012 | Rankin | ................. | A01K 91/08 43/43.13 |
| 2012/0060404 A1 * | 3/2012 | Baron | ................. | A01K 93/02 43/44.87 |
| 2017/0295770 A1 * | 10/2017 | Schoenike | ............. | A01K 91/03 |

* cited by examiner

*Primary Examiner* — Peter M Poon
*Assistant Examiner* — Shada Mohamed Alghailani
(74) *Attorney, Agent, or Firm* — Haynes and Boone, LLP

(57) ABSTRACT

An adjustable strike indicator apparatus for use in fly fishing is disclosed comprising a rigid center section and friction assembly comprising two layers of friction creating material. The two layers of friction creating material encase a section of leader fishing line. The friction assembly is mechanically coupled to the inside of a housing unit, such as an EVA foam ball, which can be manually repositioned on the section of fishing line by a user.

16 Claims, 8 Drawing Sheets

INSTANTLY ADJUSTABLE STRIKE INDICATOR CREATED BY FRICTION ASSEMBLY

FIELD

The present disclosure generally relates to fly fishing, and more particularly to strike indicators used for fly fishing with underwater flies.

BACKGROUND OF THE INVENTION

When using an underwater fly while fly fishing, the strike of a fish on the fly is often difficult to detect. Accordingly, strike indicators have become a popular addition to help detect the presence of a fish on or around the fly. More specifically, strike indicators can be attached to a leader on the fly line and float on top of the water to represent and indicate movement that may be occurring below.

While fishing with a fly rod, typically a fly line is cast upstream so that the fly moves back downstream with the current toward the fisherman. A floating strike indicator attached to the leader of the fly line can help track the location of the fly as it moves downstream. For example, if a fish, strikes, bites or swallows the fly, the action of the fish on the fly will be imparted on the strike indicator and, in most cases, will reflect an inconsistent movement with the current (i.e. the strike indicator pauses, twitches, plunges underwater, is pulled upstream, or moves cross-current, etc.). If the fisherman notices an inconsistent movement of the strike indicator, the fisherman may attempt to quickly set the hook embedded in the fly (or other lure) through manipulation of the fishing rod. In most cases, to successfully set the hook, the fisherman must act quickly or risk giving the fish time to determine that the fly is not really something it wants to eat, whereby the fish would spit the fly out of its mouth.

Accordingly, strike indicators help to signal the moment that the fly has been eaten by the fish. In order for the strike indicator to function optimally, i.e. correctly signaling a fish strike to the fisherman, the fisherman must maintain a balance between letting the fly float naturally with the current and keeping the line taught enough to deliver a quick, sharp hook set. In order to allow the fly to float naturally given specific water conditions, the fisherman must determine where best to position the strike indicator on the leader. More specifically, the positioning of the strike indicator dictates the depth at which the fly will travel through the water. Depending upon (1) the kind of fish the fisherman is trying to attract to the fly; (2) the water conditions, i.e. water depth, speed, etc.; (3) the kind of fly fishing the fisherman is performing; and (4) the kind of bait the fly is intending to emulate, the distance between the strike indicator needs to be constantly adjusted. However, the strike indicators currently used or known in the art lack the ability to be quickly or instantly adjusted by a user.

It is with respect to the above issues and other problems presently faced by those of skill in the pertinent art that the embodiments presented herein were contemplated. Embodiments provided herein solve the problems associated with the prior art and provide a system and method for an instantly adjustable strike indicator. Accordingly, the present invention solves the problems in the pertinent art by disclosing a strike indicator that can be instantly repositioned and/or adjusted by a fisherman, which allows for the fisherman to more quickly adapt to changing water conditions and to more accurately and quickly present a fly to a fish. Moreover, the current system and method does not require any installation or prior knowledge or experience, and can be successfully used by fisherman of any skill level. Other advantages and benefits will become apparent after reviewing the present disclosure.

SUMMARY OF THE INVENTION

Accordingly, the present disclosure relates to systems and methods that overcome the problems identified above. While several advantages of the system and method of one embodiment are provided in this section, this Summary is neither intended nor should it be construed as being representative of the full extent and scope of embodiments of the present invention. Embodiments of the present invention are set forth in various levels of detail in the Summary as well as in the attached drawings and in the Detailed Description, and no limitation as to the scope of this disclosure is intended by either the inclusion or non-inclusion of elements, components, etc. in the Summary. Additional aspects of the present disclosure will become more readily apparent from the materials included in the Detailed Description and Claims below.

In view of these shortcomings in the prior art, embodiments of the present invention solve the problems associated with the prior art. More specifically, embodiments of the present invention relate to systems and methods of an adjustable strike indicator for use in fly fishing. In preferred embodiments, the strike indicator apparatus comprises a rigid center section with a first end and a second end. In some preferred embodiment, the rigid center section is cylindrically shaped and is made from steel. In these preferred embodiments, the rigid center section is substantially wrapped from end to end with a layer of thread or string. The layer of thread is then covered with a layer of high-grade silicone. In some preferred embodiments the layer of silicone is a silicone band that is wrapped around the layer of thread. In some embodiments, the silicone band contains a first end and a second end, where the first end is mechanically coupled to the layer of thread at the first end of the rigid center section. The silicone band is wrapped around the first layer of thread starting at the first end of the rigid center section and ending at the second end of the rigid center section thereby forming a first layer of silicone substantially covering the first layer of thread. In these preferred embodiments, the wrapping of the silicone band is paused to allow the insertion of a section of fishing line containing a first end and a second end. In these embodiments, at least a part of the section of fishing line is placed in contact with the first layer of silicone. After the section of fishing line is in place, the wrapping of the silicone band is resumed starting at the second end of the rigid center section and ending at the first end of the rigid center section, thereby forming a second layer of silicone substantially covering the first layer of silicone and part of the section of fishing line. In these embodiments, the second layer of the silicone is mechanically coupled to the first end of the rigid center section. In these embodiments, the first layer of silicone and the second layer of silicone create a friction assembly on the section of fishing line enclosed within the first layer of silicone and the second layer of silicone.

In preferred embodiments, a layer of semi-rigid plastic is placed around the friction assembly thereby creating a plastic encased friction assembly. In these embodiments, the first end of the section of fishing line and the second end of the section of fishing line remain outside of the plastic encased friction assembly. A second layer of thread is then wrapped around the semi-rigid plastic, thereby encasing the plastic encased friction assembly and creating a thread-wrapped encased friction assembly. In preferred embodiments, a layer of adhesive material is then placed over the surface of the second layer of thread.

Preferred embodiments also include a housing unit containing an outer surface and a hollowed out cylindrical inner portion. In these embodiments, the hollowed out cylindrical inner portion of the housing unit houses the thread-wrapped encased friction assembly, where the layer of adhesive mechanically couples the thread-wrapped encased friction assembly to the hollowed out cylindrical inner portion of the housing unit. In these embodiments, the outer surface of the housing unit can be manually repositioned on the section of fishing line when moved by a user. The housing unit remains immobile after the user has completed repositioning the outer surface of the housing unit.

The Summary is neither intended nor should it be construed as being representative of the full extent and scope of the present disclosure. The present disclosure is set forth in various levels of detail in the Summary, as well as in the attached drawings and the Detailed Description, and no limitation as to the scope of the present disclosure is intended by either the inclusion or non-inclusion of elements, components, etc. in this Summary. Additional aspects of the present disclosure will become more readily apparent from the Detailed Description, particularly when taken together with the drawings. The above-described benefits, embodiments, and/or characterizations are not necessarily complete or exhaustive, and in particular, as to the patentable subject matter disclosed herein. Other benefits, embodiments, and/or characterizations of the present disclosure are possible, alone or in combination, as set forth above and/or described in the accompanying figures and/or in the description herein below. Further details and other features will become apparent after review of the following Detailed Description and accompanying drawing figures.

While the invention is described in terms of exemplary embodiments, it should be appreciated that individual aspects of the invention may be separately claimed.

BRIEF DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure invention and is not meant to limit the inventive concepts.

The accompanying drawings, which are incorporated in and constitute a part of the specification, illustrate embodiments of the disclosure and together with the general description of the disclosure given above and the detailed description of the drawings, given below, serve to explain the principles of the disclosure.

In the drawings:

FIG. 1 illustrates the rigid center section, according to an embodiment.

FIG. 2 illustrates the rigid center section being covered by a first layer of thread and a first layer of silicone, according to an embodiment.

FIG. 3 illustrates the friction assembly portion of the strike indicator, according to an embodiment.

FIG. 4 illustrates the plastic encased friction assembly, according to an embodiment.

FIG. 5 illustrates the thread wrapped encased friction assembly, according to an embodiment.

FIG. 6 illustrates the thread wrapped encased friction assembly being coated with an adhesive, according to an embodiment.

FIG. 7 illustrates the strike indicator, according to an embodiment.

FIG. 8 illustrates a completed strike indicator, according to an embodiment.

Figure 1:
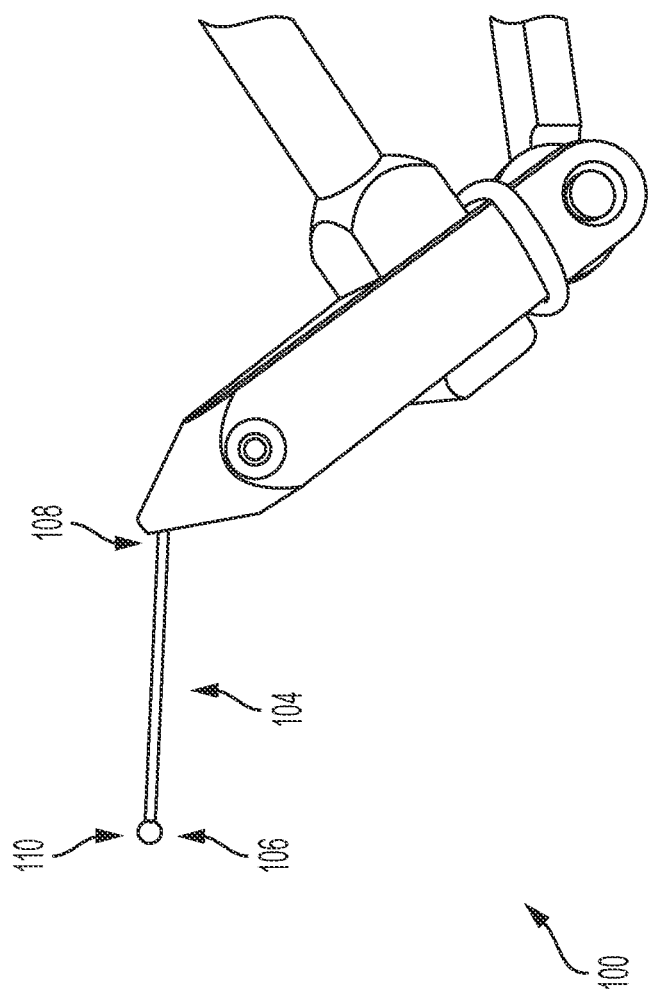

In certain instances, details that are not necessary for an understanding of the disclosure or that render other details difficult to perceive may have been omitted. It should be understood, of course, that the disclosure is not necessarily limited to the particular embodiments illustrated herein.

DETAILED DESCRIPTION

Embodiments of the present invention provide benefits across a broad spectrum of endeavors. It is applicants' intent that this specification appended hereto be accorded a breadth in keeping with the scope and spirit of the invention being disclosed despite what might appear to be limiting language imposed by the requirements of referring to the specific examples disclosed. Thus, to acquaint persons skilled in the pertinent arts most closely related to the present invention, a preferred embodiment of the system is disclosed for the purpose of illustrating the nature of the invention. The exemplary methods of installing, assembling and operating the system are described in detail according to the preferred embodiment, without attempting to describe all of the various forms and modifications in which the invention might be embodied. As such, the embodiments described herein are illustrative, and as will become apparent to those skilled in the art, can be modified in numerous ways within the scope and spirit of the invention, the invention being measured by the appended claims and not by the details of the specification.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for the sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, subparagraph (f).

Referring now to the drawings, FIGS. 1-8 depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments and variations of the invention. As a result, the invention is not limited to the specific embodiments described below, but only by the claims and their equivalents.

Embodiments of the invention describe a system 100 of an adjustable strike indicator 102 for use in fly fishing. Other embodiments can also be used for other kinds of fishing as well. As shown in FIG. 1, the strike indicator apparatus 102 comprises a rigid center section 104 with a first end 106 and a second end 108. In some preferred embodiment, the rigid center section 104 is cylindrically shaped and is made from stainless steel. Other embodiments are made from high-carbon steel or steel alloyed with Vanadium. Other embodiments may also comprise different shapes and can made from other rigid materials. In preferred embodiments, the rigid center section 104 ranges from 18 mm in length to 25 mm in length. In some preferred, the rigid center section 104 is 20 mm in length. In yet other embodiments, the rigid center section 104 is 23 mm in length. There are advantages for fly fisherman to be able to use different size strike indicators depending upon fishing conditions. In embodiments using a longer rigid center section 104, the amount of friction is increased but the strike indicator may not be as accurate in reflecting subtle strikes on the fly.

Figure 2:
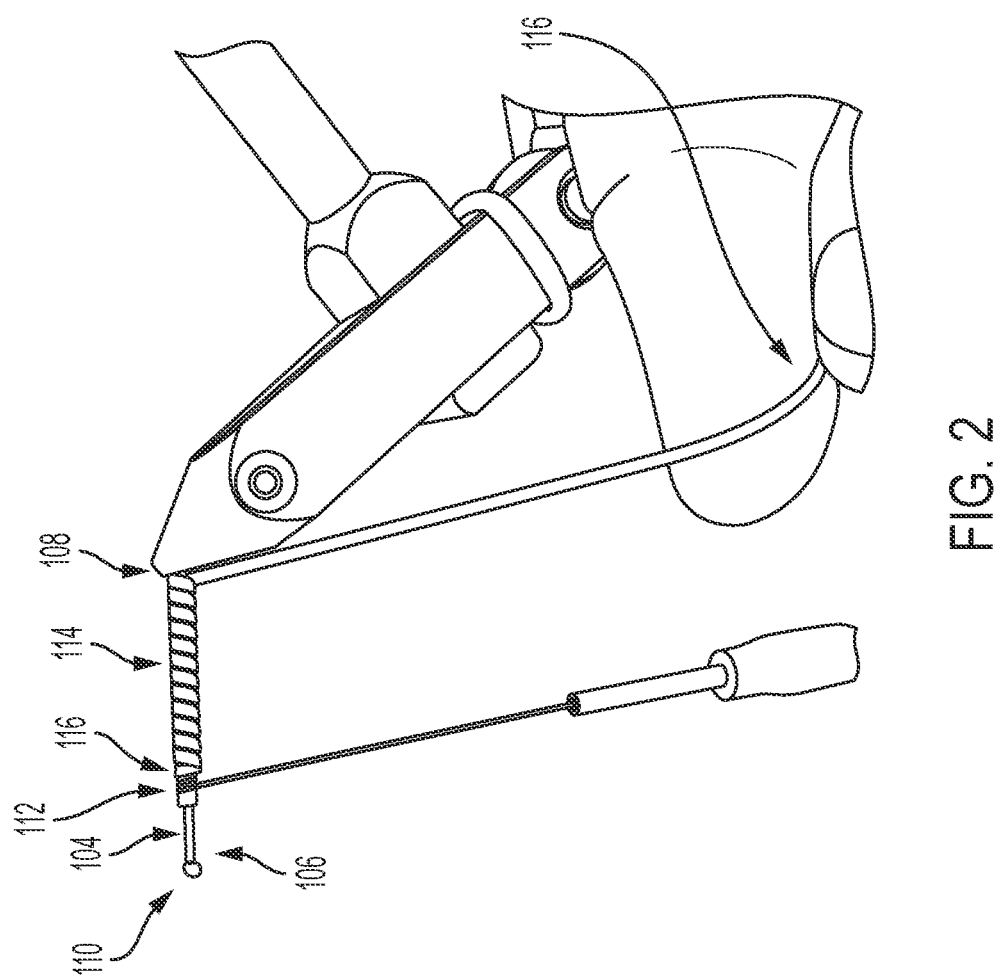

Some embodiments of the rigid center section 104 also comprise at least one eye portion 110. Some embodiments of the rigid center section 104 contain eye portions 110 on both the first end 106 and second end 108. In these embodiments, the eye portions 110 are similar to the eye portions found on the threading end of a fishhook. As shown in FIG. 2, in preferred embodiments, the rigid center section 104 is substantially wrapped from the first end 106 to the second end 108 of the rigid center section 104 with a first layer of thread 112. In these embodiments, the thread 112 provides adhesive properties that allow additional layers/materials to more easily be added on top of or around the first layer of thread 112. Other embodiments may contain a first layer of another similar material, and still yet other embodiments may not contain this first layer at all.

In the embodiments containing the first layer of thread 112, the first layer of thread 112 is then covered with a first coating 114 that comprises friction containing properties. In preferred embodiments, this first coating comprises a layer of silicone 114. Other embodiment may comprise a first layer of rubber or other elastomers. In some preferred embodiments, the first layer of silicone 114 comprises a silicone band that is wrapped around the first layer of thread 112. The first layer of silicone contains a first end 116 and a second end 118, where the first end 116 is mechanically coupled to the first layer of thread 112 at or around the first end of the rigid center section 106. In the embodiments containing one or more eye portions 110 on at least one of the first end 106 and second end 108 of the rigid center section 104, the eye portions 110 provide structural support to hold the first layer of thread 112 and the first layer of silicone 114 on to the rigid center section 104. The first layer of silicone 114 is wrapped around the first layer of thread 112 starting at or around the first end 106 of the rigid center section and ending at the second end 108 of the rigid center section 104 thereby forming a first layer of silicone 114 substantially covering the first layer of thread 112. In some embodiments, after the first layer of silicone 114 has substantially covered the first layer of thread 112, the second end of the 118 of the silicone band is tied into the first layer of thread 112 at or around the second end 108 of the rigid center section 104. In other preferred embodiments, the wrapping of the first layer of silicone 114 is paused (as shown in FIG. 2) to allow the insertion of a section of fishing line 120 containing a first end 122 and a second end 124. In these embodiments, at least a part of the section of fishing line 120 is placed in contact with the first layer of silicone 114. In preferred embodiments, the section of fishing line 120 comprises a nylon leader section that is used in fly fishing. In these embodiments, the section of fishing line ranges from 4 ft to 7 ft in length, with preferred embodiments ranging from 5.5 ft to 6 ft in length. Other embodiments may comprise different sections of fishing line at varying lengths.

Figure 3:
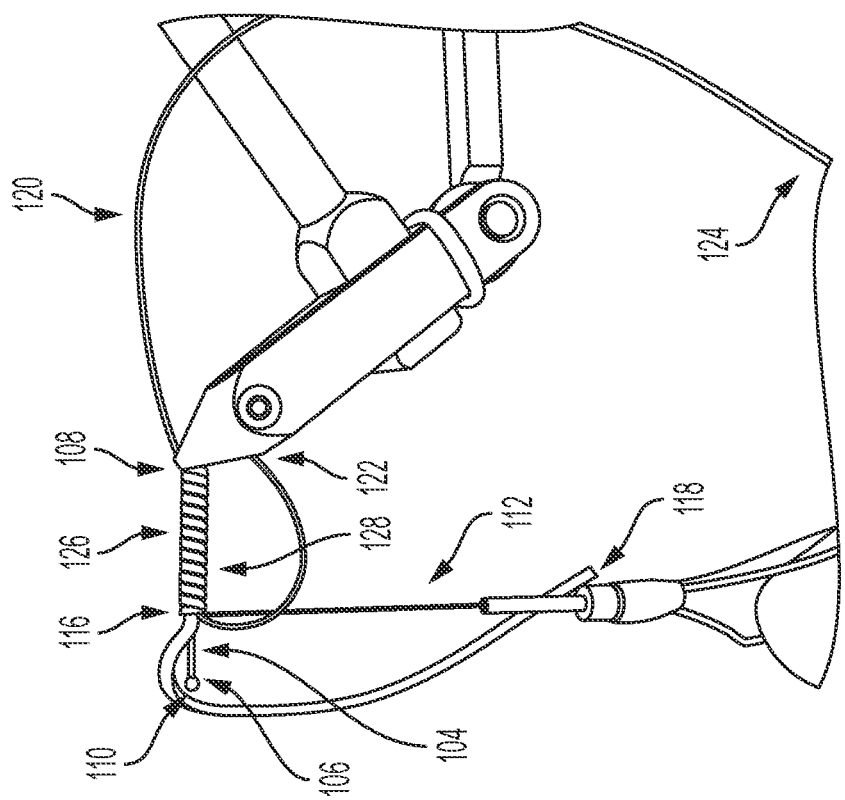

In preferred embodiments, after the section of fishing line 120 is in place, the wrapping of the silicone band is resumed starting at the second end 108 of the rigid center section 104 and ending at the first end 106 of the rigid center section 104, thereby forming a second layer of silicone 126 (as shown in FIG. 3) substantially covering the first layer of silicone 114 and part of the section of fishing line 120. In other embodiments, the second coating 126 may comprise other material that comprises friction containing properties, such as rubber or other elastomers.

In preferred embodiments, the second layer of the silicone 126 is mechanically coupled to the first end 106 of the rigid center section 104. In some embodiments, the second end 118 of the silicone band is tied into the first layer of thread 112 at or around the first end of the rigid center section. In preferred embodiments, the first layer of silicone 114 and the second layer of silicone 126 create a friction assembly 128 on the section of fishing line 120 enclosed within the first layer of silicone 114 and the second layer of silicone 126. In some preferred embodiments, both the first layer 114 and second layer of silicon 126 comprise a high heat resistant grade silicone band, for example the kind used for cooking, in order to eliminate degradation of the bands from use over time. In some preferred embodiments, first layer 114 and second layer of silicon 126 can withstand decomposition from heat up to 480° Fahrenheit. In these embodiments, the section of fishing line 120 can be manually manipulated to move in either direction through the friction assembly 128 in order to allow for repositioning of the friction assembly 128 on the section of fishing line 120.

Figure 4:
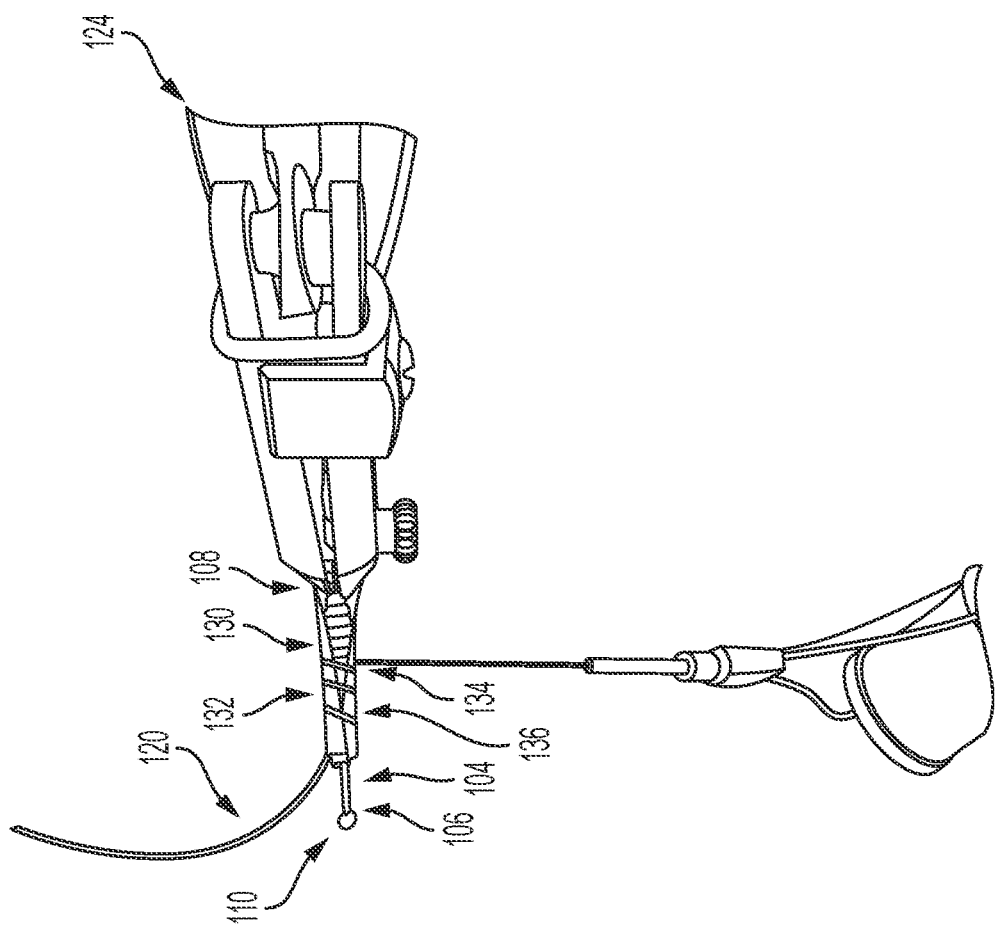
Figure 5:
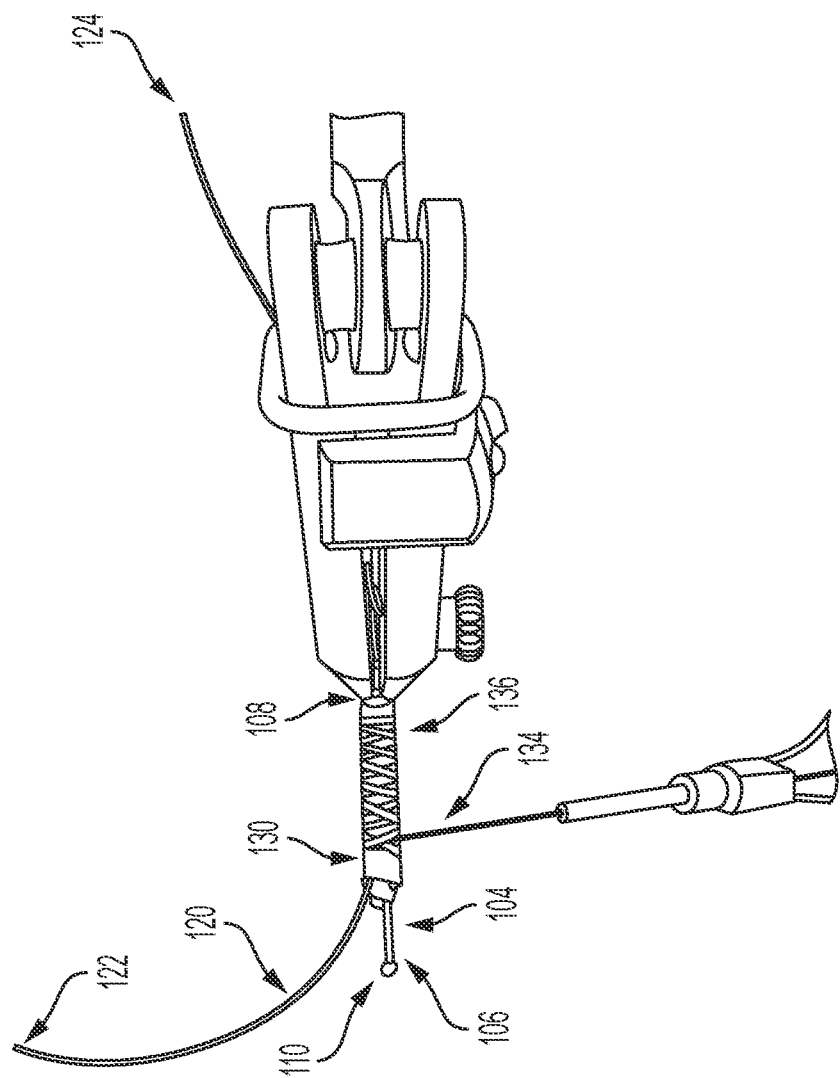

In preferred embodiments, as shown in FIGS. 4-5, a layer of semi-rigid plastic 130 is placed around the friction assembly 128 thereby creating a plastic encased friction assembly 132. In these embodiments, the first end 122 of the section of fishing line 120 and the second end 124 of the section of fishing line 120 remain outside of the plastic encased friction assembly 132. The layer of semi-rigid plastic 130 adds evenly distributed compression to the friction assembly 128 and prevents degradation of the silicone layers 114, 126 from use. Other embodiments may not contain this layer of plastic 130, or may comprise a different semi-rigid material.

Figure 6:
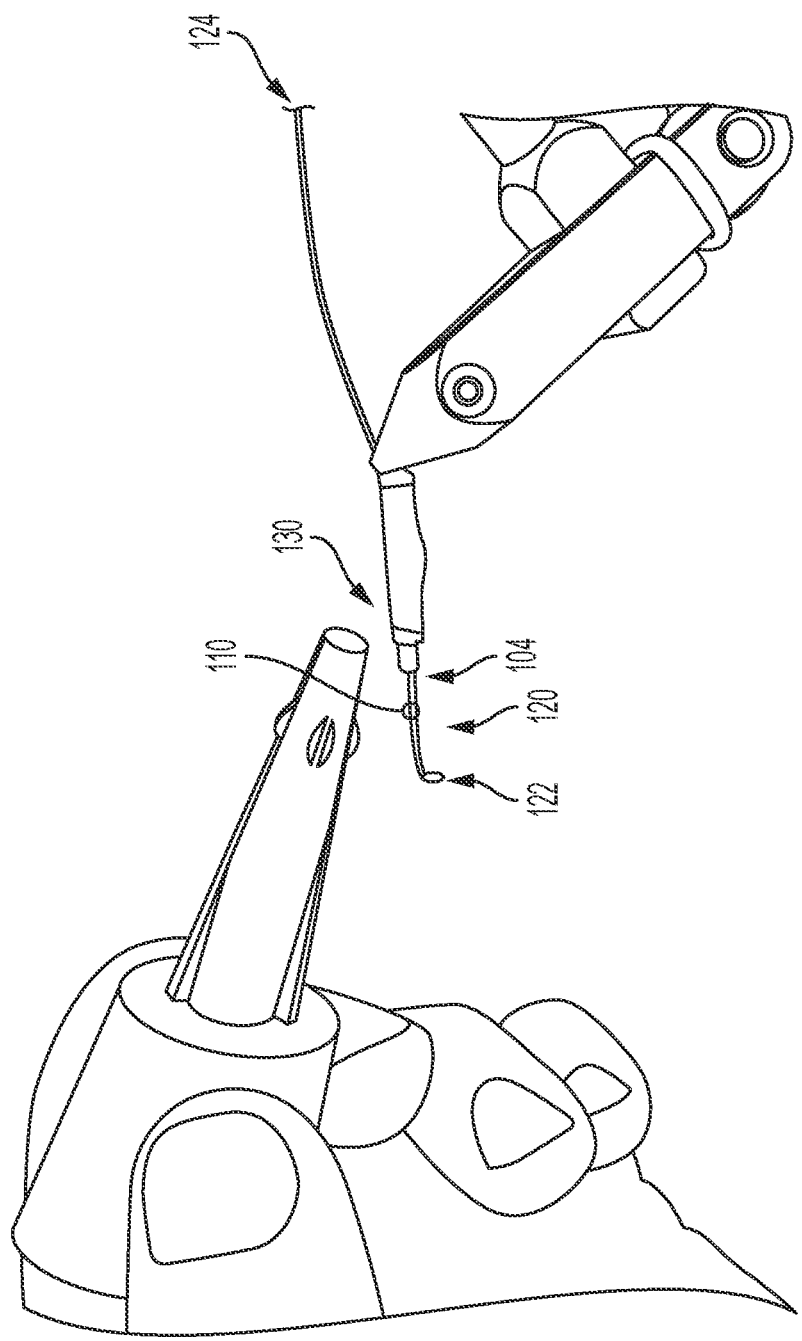

In preferred embodiments, a second layer of thread 134 is then wrapped around the semi-rigid plastic 130, thereby encasing the plastic encased friction 132 assembly and creating a thread-wrapped encased friction assembly 136. Other embodiment may not contain this second layer of thread 132, or may contain layer of another material. In preferred embodiments, as shown in FIG. 6, a layer of adhesive material 138 is then placed over the surface of the second layer of thread 134 and the thread wrapped encased friction assembly 136. In some embodiments, this layer of adhesive comprises super glue or a similar adhesive.

Figure 7:
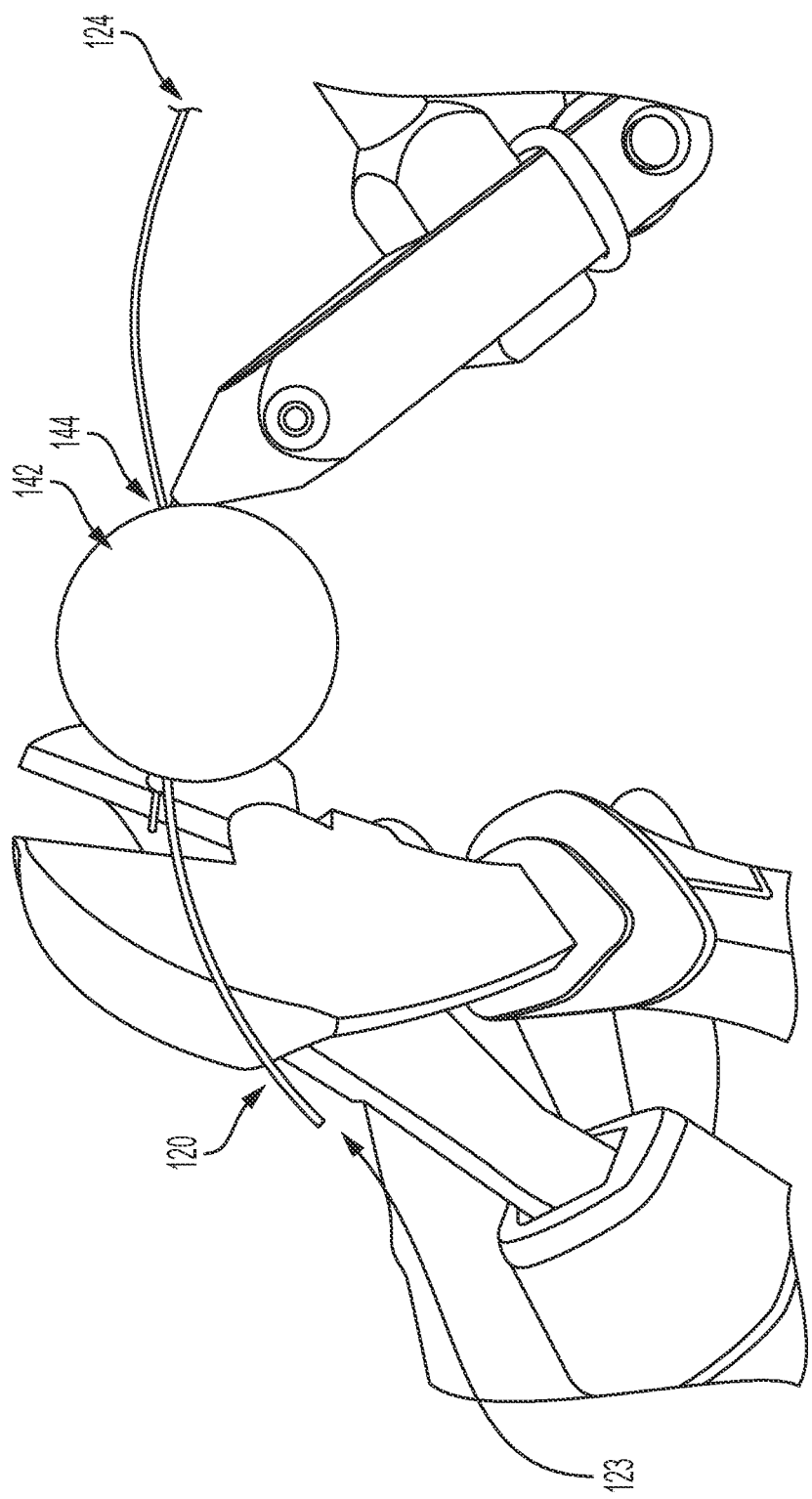
Figure 8:
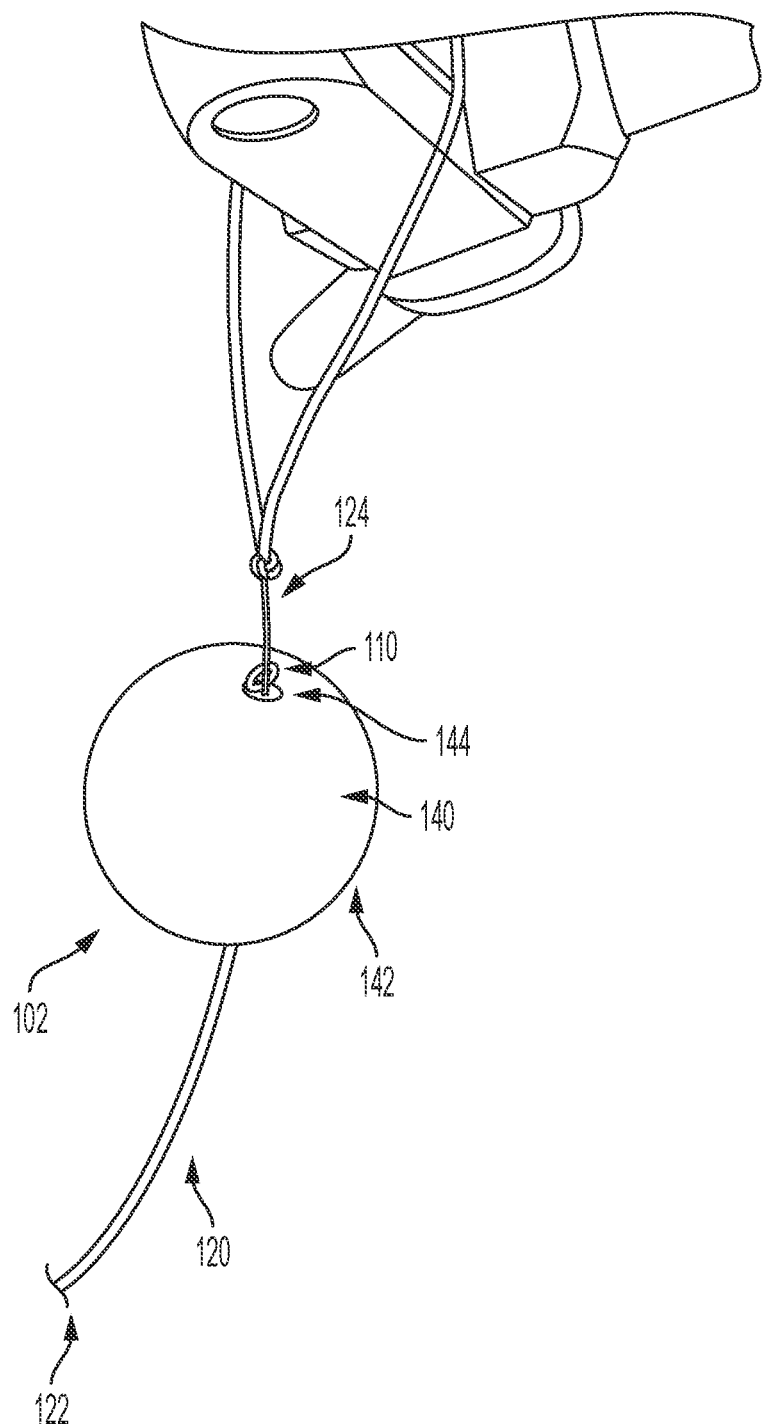

As shown in FIGS. 7-8, preferred embodiments also include a housing unit 140 containing an outer surface 142 and a hollowed out cylindrical inner portion 144. In preferred embodiments, the housing unit 140 is circular in shape and is made up of foam, encased air, cork, balsa wood, plastic or other buoyant materials. In preferred embodiments, the housing unit 140 is an EVA foam ball. In these embodiments, the hollowed out cylindrical inner portion 144 of the housing unit houses the thread-wrapped encased friction assembly 136, where the layer of adhesive 138 mechanically couples the thread-wrapped encased friction assembly 136 to the hollowed out cylindrical inner portion 144 of the housing unit 140. In these embodiments, the outer surface 142 of the housing unit 140 can be manually repositioned on the section of fishing line 120 when moved by a user. The housing unit 140 remains immobile after the user has completed repositioning the outer surface 142 of the housing unit 140. The housing unit 140, with the thread-wrapped encased friction assembly 136 inside, represents the strike indicator 102 according to preferred embodiments of the present disclosure.

In preferred embodiments, the section of leader fishing line 120 containing the strike indicator 102 can then be added/attached to a fly rod for use. The strike indicator 102 can be instantly repositioned by a user to change the depth of the fly or lure used to attract the fish.

All directional references (e.g., top, bottom, front, back) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

The above-described benefits, embodiments, and/or characterizations are not necessarily complete or exhaustive, and in particular, as to the patentable subject matter disclosed herein. Other benefits, embodiments, and/or characterizations of the present invention are possible, alone or in combination, as set forth above and/or described in the accompanying figures and/or in the description herein below.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and drawing figures are to be understood as being approximations which may be modified in all instances as required for a particular application of the novel assembly and method described herein.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description and in the appended drawing figures.

In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

The above-described benefits, embodiments, and/or characterizations are not necessarily complete or exhaustive, and in particular, as to the patentable subject matter disclosed herein. Other benefits, embodiments, and/or characterizations of the present invention are possible.

What is claimed is:

1. An adjustable strike indicator apparatus for use in fly fishing comprising:
   a rigid center section comprising a first end and a second end;
   a first layer of thread, wrapped substantially around the entirety of the rigid center section spanning from the first end to the second end;
   a first coating, covering at least part of the first layer of thread;
   a section of fishing line comprising a first end and a second end, wherein at least a part of the section of fishing line is placed in contact with the first coating;
   a second coating, covering at least part of the first coating, wherein the section of fishing line is positioned in between the first coating and the second coating, wherein the first coating and the second coating create a friction assembly on the section of fishing line enclosed within the first coating and second coating;
   a third coating substantially encasing the friction assembly, wherein the first end of the section of fishing line and the second end of the section of fishing line remain outside of the encased friction assembly;
   a second layer of thread encasing the friction assembly, thereby creating a thread-wrapped encased friction assembly; and
   a housing unit comprising an outer surface and an inner portion, wherein the inner portion of the housing unit houses the friction assembly and wherein the outer surface of the thread-wrapped encased friction assembly is mechanically coupled to the inner portion of the housing unit, wherein the outer surface of the housing unit can be manually repositioned on the section of fishing line when moved by a user, and wherein the housing unit remains immobile after the user has completed repositioning the housing unit.

2. The system of claim 1, wherein the first coating and the second coating comprise silicone.

3. The system of claim 1, wherein the third coating comprises semi-rigid plastic.

4. The system of claim 1, wherein the housing unit comprises a foam ball.

5. An adjustable strike indicator apparatus for use in fly fishing comprising:
a rigid center section comprising a first end and a second end;
a first layer of thread, wrapped substantially around the entirety of the rigid center section spanning from the first end to the second end;
a first coating of silicone, covering at least part of the first layer of thread;
a section of fishing line comprising a first end and a second end, wherein at least a part of the section of fishing line is placed in contact with the first coating;
a second coating of silicone, covering at least part of the first coating, wherein the section of fishing line is positioned in between the first coating and the second coating, wherein the first coating and the second coating create a friction assembly on the section of fishing line enclosed within the first coating and second coating;
a third coating substantially encasing the friction assembly, wherein the first end of the section of fishing line and the second end of the section of fishing line remain outside of the encased friction assembly;
a second layer of thread encasing the friction assembly, thereby creating a thread-wrapped encased friction assembly; and
a housing unit comprising an outer surface and an inner portion, wherein the inner portion of the housing unit houses the friction assembly and wherein the outer surface of the thread-wrapped encased friction assembly is mechanically coupled to the inner portion of the housing unit, wherein the outer surface of the housing unit can be manually repositioned on the section of fishing line when moved by a user, and wherein the housing unit remains immobile after the user has completed repositioning the housing unit.

6. The system of claim 5, wherein the third coating comprises semi-rigid plastic.

7. The system of claim 5, wherein the first layer and second layer of silicon comprise a high heat resistant grade silicone band.

8. The system of claim 7, wherein the high heat resistant grade silicone band is resistant to withstand decomposition from heat up to 480° Fahrenheit.

9. The system of claim 1, wherein the first coating and the second coating comprise silicone.

10. The system of claim 1, wherein the rigid center section is cylindrical shaped and comprises at least one of high-carbon steel, steel alloyed with Vanadium or stainless steel.

11. The system of claim 10, wherein the cylindrically shaped rigid center section comprises at least one eye located on the first end or the second end of the rigid center section.

12. The system of claim 1, wherein the second layer of thread comprises a layer of adhesive material substantially coating the surface of the second layer of thread, wherein the adhesive material is used to mechanically couple the friction assembly to the inner portion of the housing unit.

13. The system of claim 1, wherein the housing unit is comprised of at least one of foam, encased air, cork, balsa wood or plastic.

14. The system of claim 1, wherein the housing unit comprises a foam ball.

15. The system of claim 1, wherein the rigid center section is roughly 20 mm in length.

16. The system of claim 1, wherein the rigid center section is roughly 23 mm in length.

* * * * *